United States Patent
Kitayama et al.

(10) Patent No.: US 9,618,060 B2
(45) Date of Patent: Apr. 11, 2017

(54) ROTATION TRANSMISSION DEVICE

(71) Applicants: Naotsugu Kitayama, Shizuoka (JP);
Koji Akiyoshi, Shizuoka (JP);
Takahide Saito, Shizuoka (JP)

(72) Inventors: Naotsugu Kitayama, Shizuoka (JP);
Koji Akiyoshi, Shizuoka (JP);
Takahide Saito, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 14/361,318

(22) PCT Filed: Dec. 7, 2012

(86) PCT No.: PCT/JP2012/081768
§ 371 (c)(1),
(2) Date: May 29, 2014

(87) PCT Pub. No.: WO2013/089029
PCT Pub. Date: Jun. 20, 2013

(65) Prior Publication Data
US 2014/0345999 A1 Nov. 27, 2014

(30) Foreign Application Priority Data

Dec. 13, 2011 (JP) ................................. 2011-272354
Nov. 13, 2012 (JP) ................................. 2012-249374

(51) Int. Cl.
*F16D 41/06* (2006.01)
*F16D 27/10* (2006.01)
(Continued)

(52) U.S. Cl.
CPC ......... *F16D 41/064* (2013.01); *F16D 27/108* (2013.01); *F16D 41/088* (2013.01);
(Continued)

(58) Field of Classification Search
CPC ................................................... F16D 27/108
See application file for complete search history.

(56) References Cited

U.S. PATENT DOCUMENTS 3,247,727 A * 4/1966 Digby .................... F02N 15/02
192/45.018
5,924,510 A * 7/1999 Itoh .................... B60K 17/3505
180/197
(Continued)

FOREIGN PATENT DOCUMENTS

EP 1 688 293 8/2006
EP 1 764 525 3/2007
(Continued)

OTHER PUBLICATIONS

Extended European Search Report issued May 20, 2016 in corresponding European Application No. 12857692.3.
(Continued)

*Primary Examiner* — Mark Manley
(74) *Attorney, Agent, or Firm* — Wenderoth, Lind & Ponack, L.L.P.

(57) ABSTRACT

A rotation transmission device is configured such that when an electromagnet of an electromagnetic clutch is energized, a control retainer of a two-way clutch is moved in the axial direction, so that the control retainer and a rotary retainer rotate relative to each other in the direction in which the circumferential widths of pockets decrease, thereby disengaging pairs of rollers from an outer ring and an inner ring. A spring holder is provided which is fixed to an input shaft and kept in abutment with an axial end surface of the inner ring to prevent relative rotation between the control retainer and the rotary retainer in the direction in which the circumferential widths of the pockets decrease, from the neutral position of the rollers. The spring holder is prevented from axial movement to prevent untimely engagement of the two-way clutch. The inner ring is integral with the input shaft.

14 Claims, 9 Drawing Sheets

(51) Int. Cl.
*F16D 41/08* (2006.01)
*F16D 41/064* (2006.01)
*F16D 27/108* (2006.01)
*F16D 41/10* (2006.01)
*F16D 23/12* (2006.01)
*F16D 27/112* (2006.01)

(52) U.S. Cl.
CPC .......... *F16D 41/105* (2013.01); *F16D 27/112* (2013.01); *F16D 2023/123* (2013.01)

(56) References Cited

U.S. PATENT DOCUMENTS

| | | | |
|---|---|---|---|
| 2006/0180424 A1* | 8/2006 | Sato | F16D 27/112 192/35 |
| 2008/0060896 A1 | 3/2008 | Saito et al. | |
| 2010/0314212 A1 | 12/2010 | Akiyoshi et al. | |

FOREIGN PATENT DOCUMENTS

| | | | |
|---|---|---|---|
| JP | 2005-155834 | * | 6/2005 |
| JP | 2009-144771 | | 7/2009 |
| JP | 2009-191952 | | 8/2009 |
| JP | 2009-287724 | | 12/2009 |
| JP | 2009-293679 | | 12/2009 |
| WO | 2009/075256 | | 6/2009 |

OTHER PUBLICATIONS

International Search Report issued Jan. 15, 2013 in International (PCT) Application No. PCT/JP2012/081768.
Written Opinion of the International Searching Authority (with English translation) issued Jan. 15, 2013 in International (PCT) Application No. PCT/JP2012/081768.

* cited by examiner

ROTATION TRANSMISSION DEVICE

TECHNICAL FIELD

This invention relates to a rotation transmission device which can selectively transmit rotation of one member to another member.

BACKGROUND ART

One known rotation transmission device which can selectively transmit rotation of a driving shaft to a driven shaft includes a two-way clutch and an electromagnetic clutch for selectively engaging and disengaging the two-way clutch.

The rotation transmission device disclosed in the below-identified Patent document 1 includes an outer ring, an inner ring mounted inside the outer ring, and a control retainer and a rotary retainer each having bars and mounted between the inner and outer rings such that the bars of the control retainer are arranged circumferentially alternating with the bars of the rotary retainer, whereby pockets are defined between circumferentially adjacent pairs of the bars of the respective retainers. The rotation transmission device further includes opposed pairs of rollers, each pair being mounted in one of the pockets, and elastic members each mounted in one of the pockets and biasing the opposed pair of rollers in the one of the pockets away from each other to a stand-by position where the rollers can instantly engage a cylindrical surface formed on the inner periphery of the outer ring and one of cam surfaces formed on the outer periphery of the inner ring such that when the inner ring rotates in either direction, one of each pair of rollers engages the cylindrical surface and the cam surface, thereby transmitting rotation of the inner ring to the outer ring.

The rotation transmission device further includes an electromagnetic clutch mounted on an input shaft, which carries the inner ring. The electromagnetic clutch is configured to move the control retainer in the axial direction when the electromagnet of the electromagnetic clutch is energized. When the control retainer is moved in the axial direction by the electromagnetic clutch, the retainers are rotated relative to each other in the direction in which the circumferential widths of the pockets decrease due to the action of a torque cam provided between the opposed surfaces of a flange of the control retainer and a flange of the rotary retainer, whereby the pairs of rollers are moved by the bars of the respective retainers to the disengaged position, thus preventing transmission of rotation from the inner ring to the outer ring.

In this rotation transmission device, when the electromagnet of the electromagnetic clutch is de-energized, the control retainer and the rotary retainer are rotated relative to each other in the direction in which the circumferential widths of the pockets increase under the biasing force of the elastic members mounted between the respective opposed pairs of rollers. Thus the rollers can instantly engage the cylindrical surface and the cam surfaces, so that the rollers scarcely move in the circumferential direction when engaging the cylindrical surface and the cam surfaces. The response time is thus short.

PRIOR ART DOCUMENT(S)

Patent Document(s)

Patent document 1: Japanese Patent Publication 2009-293679A

SUMMARY OF THE INVENTION

Object of the Invention

In the conventional rotation transmission device disclosed in Patent document 1, since the opposed pairs of rollers are always at the stand-by position, where the rollers can instantly engage, and the inner ring is fitted on the input shaft, while response time is short, gaps in the rotational direction may form between the fitting surfaces of the input shaft and the inner ring. Such gaps may result in a delay in transmission of rotation from the input shaft to the output shaft. It is desired to more quickly transmit rotation from the input shaft to the output shaft.

An object of the present invention is to provide a rotation transmission device which operates with high accuracy and can respond quickly without the possibility of untimely engagement of the two-way clutch.

Means for Achieving the Object

In order to achieve this object, the present invention provides a rotation transmission device comprising an input shaft, an output shaft arranged coaxial with the input shaft, a two-way clutch configured to selectively transmit torque between the input shaft and the output shaft, and an electromagnetic clutch configured to selectively engage and disengage the two-way clutch, wherein the two-way clutch comprises an outer ring provided at an end of the output shaft, an inner ring provided at an end of the input shaft, a control retainer and a rotary retainer having bars disposed between the inner periphery of the outer ring and the outer periphery of the inner ring and arranged such that the bars of the control retainer circumferentially alternate with the respective bars of the rotary retainer, with pockets defined between adjacent ones of the bars of the control retainer and the rotary retainer, a plurality of pairs of engaging elements, each pair of the engaging elements being mounted in one of the pockets so as to be engageable with the inner periphery of the outer ring and the outer periphery of the inner ring, and elastic members mounted in the respective pockets and biasing the respective pairs of engaging elements away from each other, wherein the electromagnetic clutch includes an electromagnet, and configured such that when the electromagnet is energized, the electromagnetic clutch moves the control retainer in the axial direction, thereby rotating the control retainer and the rotary retainer relative to each other in the direction in which the circumferential widths of the pockets decrease, and disengaging the engaging elements, wherein the rotation transmission device further comprises an annular spring holder kept in abutment with an axial end surface of the inner ring and rotationally fixed to the inner ring, braking pieces provided at the outer periphery of the spring holder and configured to support the bars of the control retainer and the rotary retainer so as to prevent the control retainer and the rotary retainer from rotating relative to each other in the direction in which the circumferential widths of the pockets decrease, from a neutral position where the pairs of engaging elements are disengaged, and spring retaining pieces extending from outer the peripheral portions of the respective braking pieces so as to be located radially outwardly of the respective elastic members, thereby preventing separation of the elastic members, wherein the inner ring is integral with the input shaft, and wherein the rotation transmission device further comprises a positioning means configured to prevent separation of the spring holder from the axial end surface of the inner ring.

With this arrangement, when the electromagnet of the electromagnetic clutch is energized, the control retainer and the rotary retainer rotate relative to each other in the direction in which the circumferential widths of the pockets decrease, so that the pairs of rollers are pushed by the bars of the control retainer and the rotary retainer and moved to the disengaged position, preventing transmission of rotation from the input shaft to the output shaft.

At this time, the bars of the control retainer and the bars of the rotary retainer collide hard against the respective circumferential side edges of the braking pieces. If, due to such hard collision, the spring holder should be moved in the axial direction and inclined, the spring holder might prevent the control retainer from returning to the predetermined disengaged position when the electromagnetic clutch is de-energized, keeping the two-way clutch in engagement in error.

But in the rotation transmission device according to the present invention, since the spring holder is axially positioned by the positioning means, even if the spring holder moves in the circumferential direction, the spring holder never moves in the axial direction. Thus, the spring holder will never prevent axial movement of the control retainer member, which in turn prevents untimely engagement of the two-way clutch.

Since the inner ring is integral with the input shaft, the rotation of the input shaft can be instantly transmitted to the outer ring without delay.

The spring holder may be positioned in any of the following manners a to f:

a. The spring holder is fixed in position relative to the input shaft by welding or adhesive bonding;

b. A snap ring is mounted to the radially outer surface of the input shaft to prevent the spring holder from moving away from the inner ring;

c. An external thread is formed on the radially outer surface of the input shaft, a nut member is kept in threaded engagement with the external thread, and an inner peripheral portion of the spring holder is sandwiched by the nut member and the inner ring from opposite axial sides, thereby fixing the spring holder in the axial direction;

d. Engaging claws are provided which extend inwardly from ends of the respective spring retaining pieces of the spring holder and engage the other axial side surface of the inner ring, thereby preventing axial movement of the spring holder;

e. The spring holder is mounted between a bearing rotatably supporting the end of the input shaft and the inner ring such that its inner peripheral portion is sandwiched between the inner ring and the bearing, thereby preventing axial movement of the spring holder; and f. A spacer is mounted between opposed portions of the electromagnetic clutch and the spring holder such that the spacer presses the spring holder against the axial end surface of the inner ring, thereby preventing the spring holder from being moved away from the inner ring.

In the rotation transmission device according to the present invention, in order to reduce the cost, the spring holder is preferably formed by pressing a steel plate.

Advantages of the Invention

According to the present invention, since the positioning means axially positions the spring holder, which is configured to prevent the control retainer and the rotary retainer from rotating relative to each other in the direction in which the circumferential widths of the pockets decrease, from the position where the engaging elements are in the neutral position, it is possible to completely eliminate the possibility of the spring holder interfering with the axial movement of the control retainer. This in turn prevents untimely engagement of the two-way clutch, so that the rotation transmission device operates with high reliability.

If the inner ring is fitted on the input shaft, gaps in the rotational direction may form between their fitting surfaces. Such gaps may result in a delay in transmission of rotation from the input shaft to the output shaft. But according to the present invention, since the inner ring is integral with the input shaft, no gaps form in the rotational direction, so that the rotation of the input shaft is instantly transmitted to the output shaft through the two-way clutch. The rotation transmission device can thus respond sufficiently quickly.

BEST MODE FOR EMBODYING THE INVENTION

Figure 1:
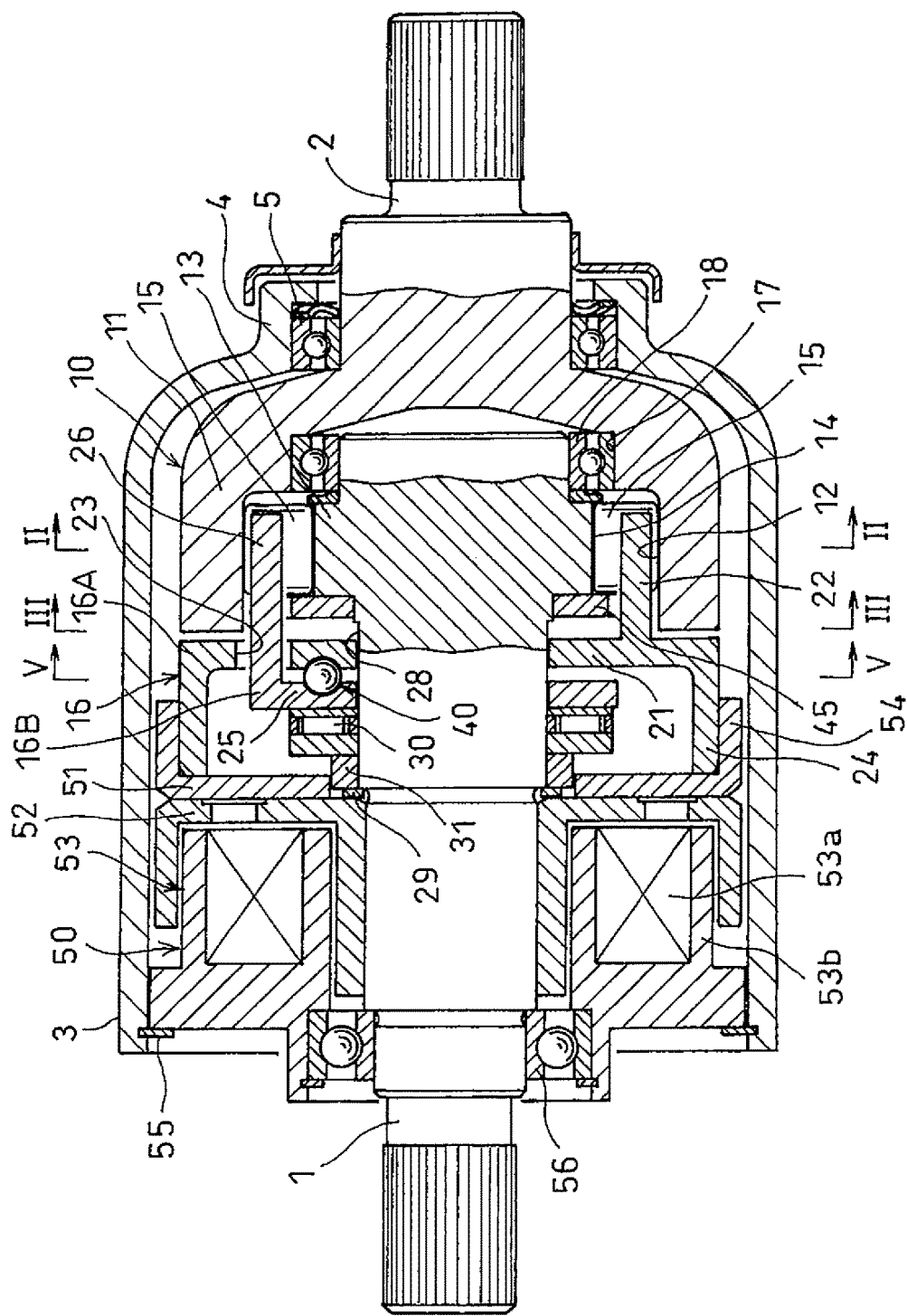
FIG. 1 is a vertical sectional view of a rotation transmission device embodying the present invention.

Now the embodiment of the present invention is described with reference to the drawings. FIG. 1 shows a rotation transmission device embodying the present invention. As shown, the rotation transmission device includes an input shaft 1, an output shaft 2 arranged coaxial with the input shaft 1, a housing 3 covering the opposed end portions of the shafts 1 and 2, a two-way clutch 10 mounted in the housing 3 and configured to selectively transmit the rotation of the input shaft 1 to the output shaft 2, and an electromagnetic clutch 50 for selectively engaging and disengaging the two-way clutch 10.

The housing 3 is a cylindrical member formed with a small-diameter bearing tube 4 at one end thereof. The output shaft 2 is rotatably supported by a bearing 5 mounted in the bearing tube 4.

Figure 2:
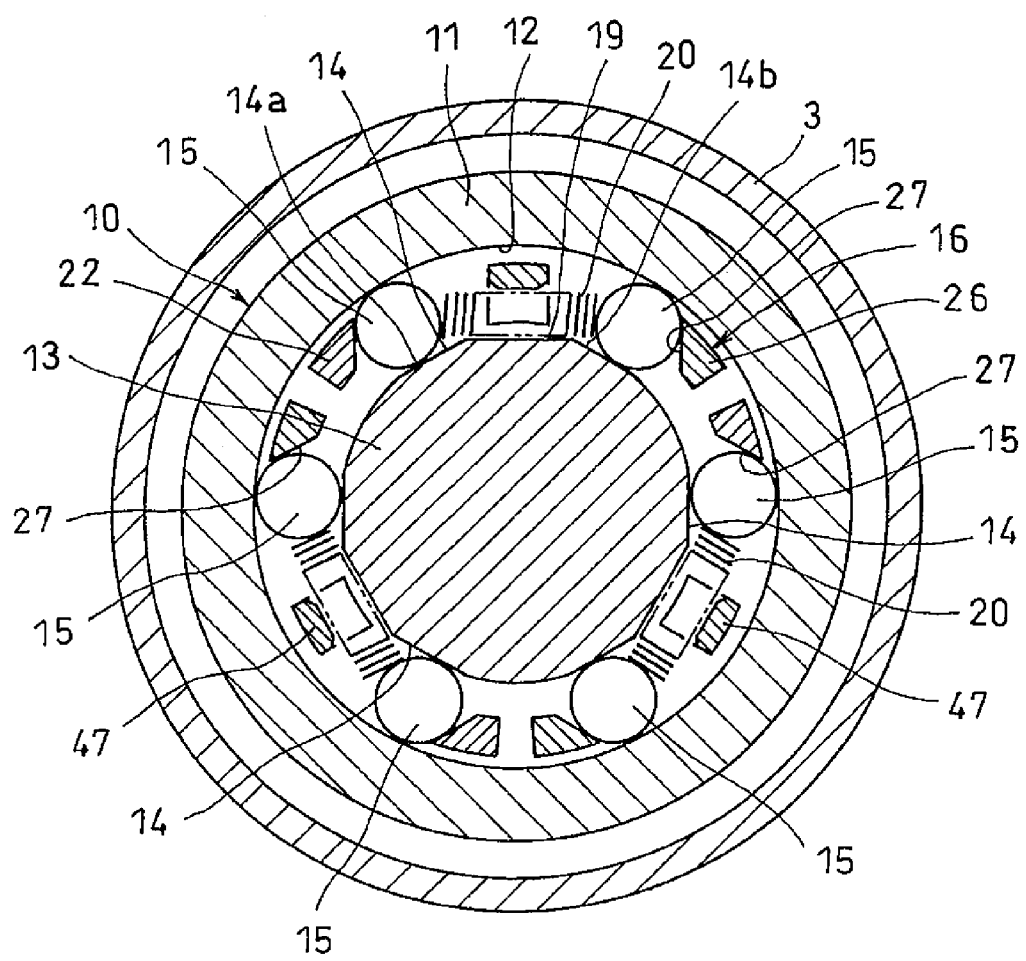
FIG. 2 is a sectional view taken along line II-II of FIG. 1.

As shown in FIGS. 1 and 2, the two-way clutch 10 includes an outer ring 11 provided at the end of the output shaft 2 and formed with a cylindrical surface 12 on the inner periphery of the outer ring 11, and an inner ring 13 provided at the end of the input shaft 1 and formed with a plurality of circumferentially equidistantly spaced apart cam surfaces 14 on the outer periphery of the inner ring 13. A pair of rollers 15 as engaging elements and an elastic member 20 are disposed between each cam surface 14 and the cylindrical surface 12. The two-way clutch 10 further includes a retainer 16 retaining the rollers 15 such that when the inner ring 13 rotates in one direction, one of each pair of rollers 15 engages the cylindrical surface 12 and the cam surface 14, thereby transmitting the rotation of the inner ring 13 to the outer ring 11, and when the outer ring 11 rotates in the other direction, the other of each pair of rollers 15 engages the cylindrical surface 12 and the cam surface 14, thereby transmitting the rotation of the inner ring 13 to the outer ring 11.

A small-diameter recess 17 is formed in the inner surface of the closed end of the outer ring 11. The input shaft 1 has its end rotatably supported by a bearing 18 mounted in the recess 17.

The inner ring 13 is integral with the input shaft 1. The cam surfaces 14, which are formed on the outer periphery of the inner ring 13, each comprise a pair of ramps 14a and 14b which are inclined in opposite directions to each other. Each of the ramps 14a and 14b defines a wedge-shaped space narrowing toward the circumferential ends thereof in cooperation with the cylindrical surface 12. Flat spring support surfaces 19 extend in the tangential directions of the inner ring 13 between the respective pairs of ramps 14a and 14b to support the respective elastic members 20.

The elastic members 20 are coil springs, and are disposed between the respective pairs of rollers 15. The elastic members 20 thus bias the respective pairs of rollers 15 away from each other toward standby positions where the rollers 15 can instantly engage the cylindrical surface 12 and the cam surfaces 14.

Figure 5:
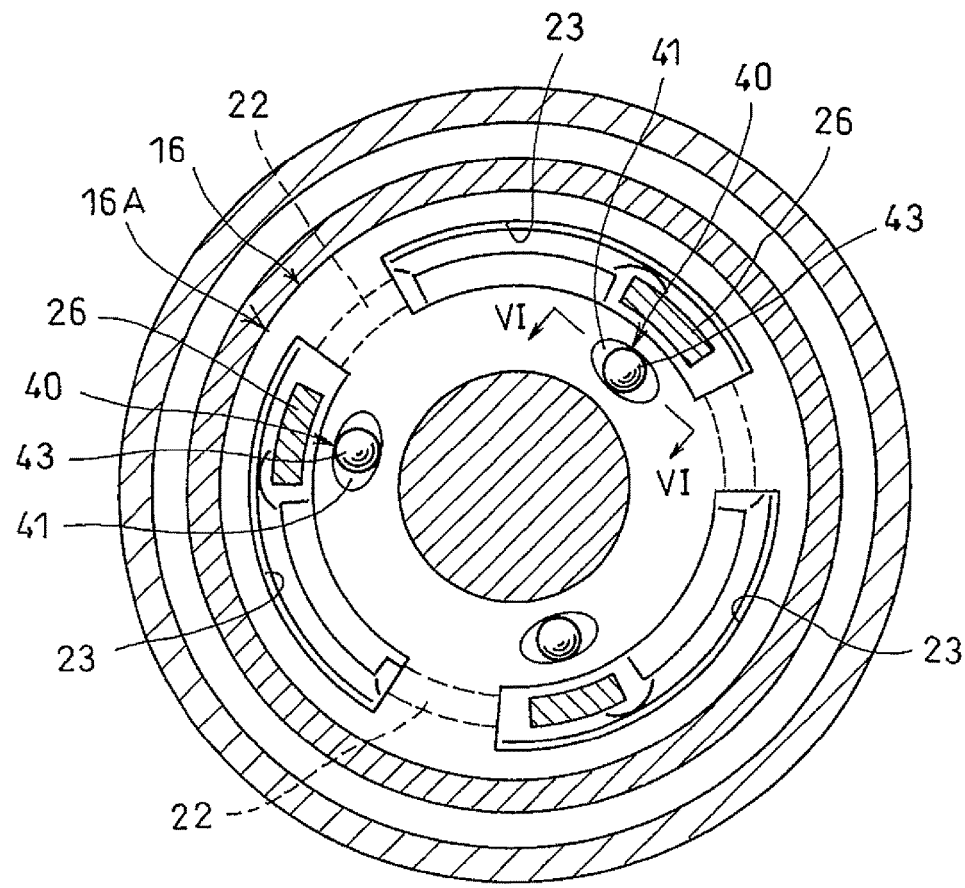
FIG. 5 is a sectional view taken along line V-V of FIG. 1.

The retainer 16 comprises a control retainer member 16A and a rotary retainer member 16B. As shown in FIGS. 1 and 5, the control retainer member 16A includes an annular flange 21, and bars 22 equal in number to the number of the cam surfaces 14 and extending from the radially outer portion of one side of the annular flange 21 while being circumferentially equidistantly spaced apart from each other. The annular flange 21 is formed with circular arc-shaped elongated holes 23 between the respective adjacent pairs of bars 22. The control retainer member 16A further includes a tubular portion 24 extending from the radially outer edge of the annular flange 21 in the opposite direction to the bars 22.

The rotary retainer member 16B includes an annular flange 25, and bars 26 equal in number to the number of the cam surfaces 14 and extending from the radially outer edge of the annular flange 25 while being circumferentially equidistantly spaced apart from each other.

The control retainer member 16A and the rotary retainer member 16B are combined together in such a way that the bars 26 of the rotary retainer member 16B are received in the respective elongated holes 23 of the control retainer member 16A such that the bars 22 and 26 are arranged circumferentially alternating with each other. In this combined state, the distal ends of the bars 22 and 26 are disposed between the outer ring 11 and the inner ring 13, while the flange 21 of the control retainer member 16A and the flange 25 of the rotary retainer member 16B are located outside the outer ring 11.

With the retainer members 16A and 16B mounted in position in this manner, as shown in FIG. 2, pockets 27 are defined between the respective bars 22 of the control retainer member 16A and the corresponding bars 26 of the rotary retainer member 16B so as to radially face the respective cam surfaces 14 of the inner ring 13. A pair of the rollers 15 and one of the elastic members 20 are received in each pocket 27 with the rollers facing each other.

As shown in FIG. 1, the flange 21 of the control retainer member 16A and the flange 25 of the rotary retainer member 16B are supported by a slide guide surface 28 formed on the outer periphery of the input shaft 1 so as to be slidable along the slide guide surface 28.

A snap ring 29 is fitted at the end of the slide guide surface 28 facing the electromagnetic clutch 50. A thrust bearing 30 and a guide ring 31 are mounted between the snap ring 29 and the flange 25 of the rotary retainer member 16B to rotatably support the rotary retainer member 16B while preventing the rotary retainer member 16B from moving toward the electromagnetic clutch 50.

As shown in FIG. 1, a motion converter mechanism in the form of a torque cam 40 is provided between the flange 21 of the control retainer member 16A and the flange 25 of the rotary retainer member 16B to convert the axial movement of the control retainer member 16A to the relative rotary motion between the control retainer member 16A and the rotary retainer member 16B.

Figure 6:
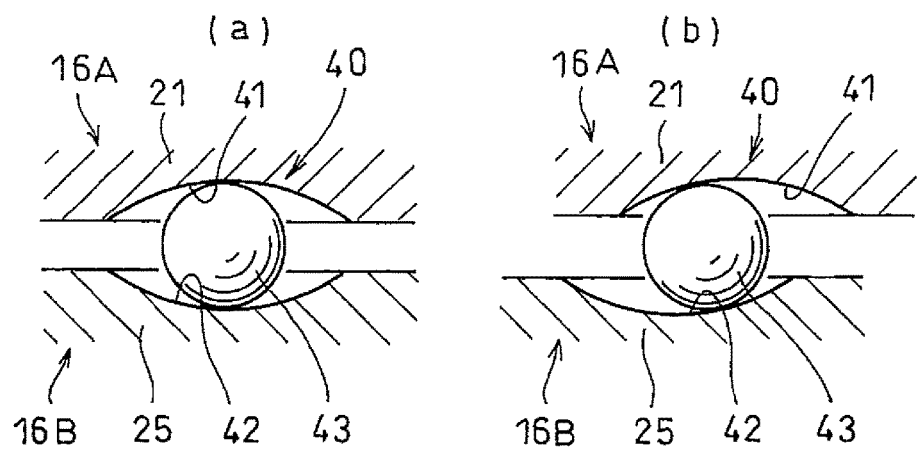
FIG. 6(a) is a sectional view taken along line VI-VI of FIG. 5.
FIG. 6(b) is a similar sectional view showing an operational state.
Figure 7:
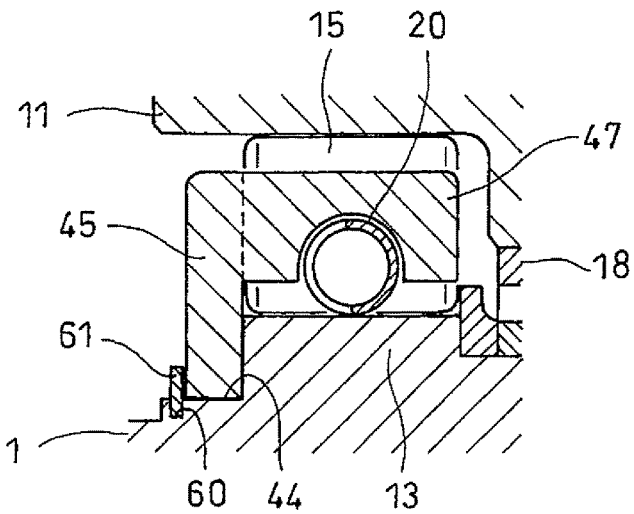
FIG. 7 is a sectional view of a different positioning means for a spring holder.

As shown in FIGS. 6(a) and 6(b), the torque cam 40 includes an opposed pairs of cam grooves 41 and 42 formed in the respective opposed surfaces the flange 21 of the control retainer member 16A and the flange 25 of the rotary retainer member 16B. The cam grooves 41 and 42 are each deepest at the circumferential center and its depth gradually decreases toward the respective circumferential ends. A ball 43 is mounted between one circumferential end of one of each opposed pair of cam grooves 41 and 42 and the opposite circumferential end of the other of the pair of cam grooves 41 and 42.

The cam grooves 41 and 42 shown are circular arc-shaped grooves. But V-shaped cam grooves may be used instead.

The torque cam 40 is configured such that when the control retainer member 16A is moved in the axial direction in which the flange 21 of the control retainer member 16A approaches the flange 25 of the rotary retainer member 16B, the balls 43 of the torque cam 40 roll toward the deepest points of the respective opposed pairs of cam grooves 41 and 42 (shown in FIG. 6(a)), thereby rotating the control retainer member 16A and the rotary retainer member 16B relative to each other in the direction in which the circumferential widths of the pockets 27 decrease.

Figure 3:
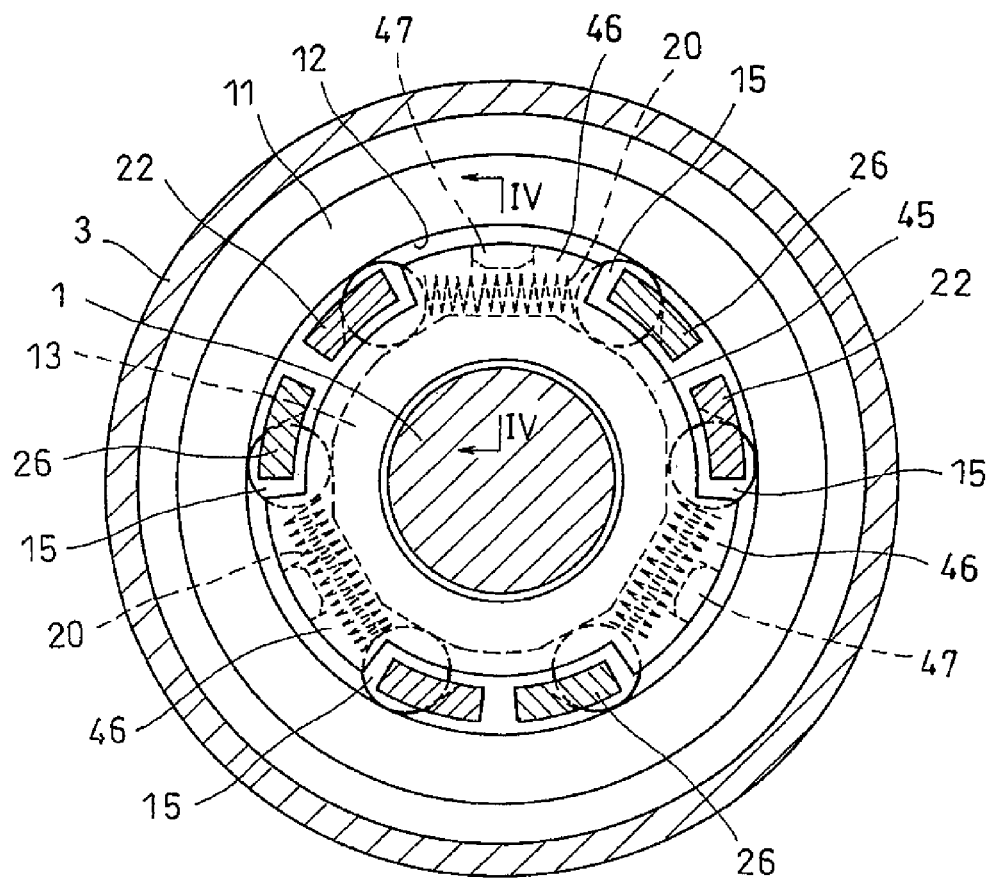
FIG. 3 is a sectional view taken along line III-III of FIG. 1.
Figure 4:
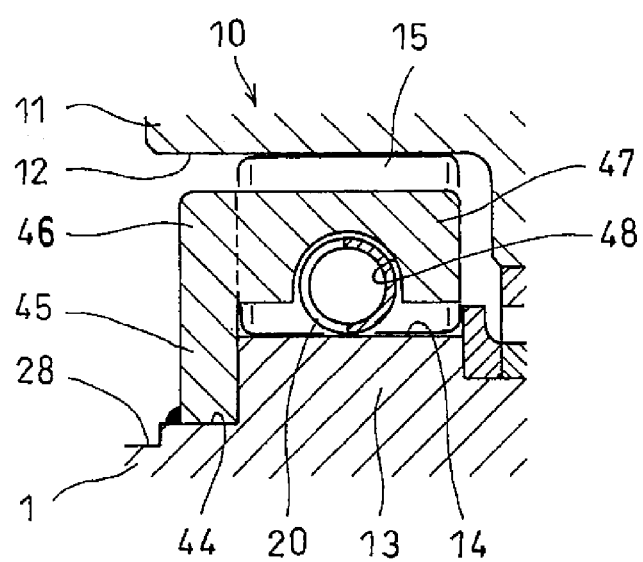
FIG. 4 is a sectional view taken along line IV-IV of FIG. 3.

As shown in FIGS. 3 and 4, a cylindrical holder fitting surface 44 is formed between a first axial end surface of the inner ring 13 and the slide guide surface 28. The holder fitting surface 44 has a larger diameter than the slide guide surface 28. An annular spring holder 45 is fitted on the holder fitting surface 44 to prevent axial separation of the rollers 15 and the elastic members 20.

The spring holder 45 is axially positioned by being brought into abutment with the first axial end surface of the inner ring 13. In this state, the spring holder 45 is fixed to the holder fitting surface 44 by positioning means comprising welding, but may be fixed to the holder fitting surface 44 by adhesive bonding.

The spring holder 45 has on its outer periphery a plurality of braking pieces 46 disposed between the respective adjacent bars 22 and 26 of the control retainer member 16A and the rotary retainer member 16B.

The braking pieces 46 are arranged such that when the control retainer member 16A and the rotary retainer member 16B rotate relative to each other in the direction in which the circumferential widths of the pockets 27 decrease, the braking pieces 46 receive the bars 22 of the control retainer member 16A and the bars 26 of the rotary retainer member 16B on their side edges, thereby keeping the opposed pairs of rollers 15 at their neutral, disengaged position.

The braking pieces 46 each have on its outer peripheral portion a spring retaining piece 47 extending in the axial direction to overhang one of the elastic members 20. The spring retaining piece 47 has a cutout 48 in its radially inner surface in which the elastic member 20 has its outer peripheral portion engaged such that the elastic member 20 is not movable in the axial direction of the rollers 15, and thus inseparable from between the opposed pair of rollers 15.

As shown in FIG. 1, the electromagnetic clutch 50 includes an armature 51 axially facing the end surface of the tubular portion 24 of the control retainer member 16A, a rotor 52 axially facing the armature 51, and an electromagnet 53 axially facing the rotor 52.

The armature 51 is rotatably and slidably supported by the guide ring 31, which is fitted on the slide guide surface 28 of the input shaft 1. The armature 51 has a coupling tube 54 at its outer peripheral portion in which the tubular portion 24 of the control retainer member 16A is press-fitted, so that the control retainer member 16A and the armature 51 are fixedly coupled together. Since these two members are fixedly coupled together, the armature 51 is slidably supported by two axially spaced apart surfaces, i.e. by the outer peripheral surface of the guide ring 31 and by the slide guide surface 28, which is formed on the outer periphery of the input shaft 1.

The rotor 52 is fitted on the input shaft 1 so as to be axially positioned and rotationally fixed, relative to the input shaft 1.

As shown in FIG. 1, the electromagnet 53 comprises an electromagnetic coil 53a, and a core 53b supporting the electromagnetic coil 53a. The core 53b is fitted in the opening of the housing 3 at the other end and prevented from coming out of the housing 3 by a snap ring 55 mounted in the opening of the housing at the other end. The core 53b is rotatably supported by the input shaft 1 through a bearing 56 fitted on the input shaft 1.

FIG. 1 shows the rotation transmission device of this embodiment while the electromagnetic coil 53a of the electromagnet 53 is not being activated and thus the armature 51 is spaced apart from the rotor 52. In this state, as shown in FIG. 2, the respective opposed pairs of rollers 15 of the two-way clutch 10 are in a stand-by position where the rollers 15 can instantly engage the cylindrical surface 12 of the outer ring 11 and the cam surfaces 14 of the inner ring 13.

While in FIG. 1, the armature 51 and the rotor 52 appear to be in close contact with each other, a gap actually exists between the armature 51 and the rotor 52.

With the two-way clutch 10 in the stand-by position, when the electromagnetic coil 53a is energized, an attraction force is applied to the armature 51, so that the armature 51 is axially pulled toward and pressed against the rotor 52.

Since the armature 51 is fixedly coupled to the control retainer member 16A, when the armature 51 is moved axially, the control retainer member 16A is moved in the direction in which the flange 21 of the control retainer member 16A approaches the flange 25 of the rotary retainer member 16B.

At this time, the balls 43 move from the position shown in FIG. 6(b) to the position shown in FIG. 6(a), in which the balls 43 are at the deepest points of the respective cam grooves 41 and 42, thus causing the control retainer member 16A and the rotary retainer member 16B to be rotated relative to each other in the direction in which the circumferential widths of the pockets 27 decrease. Thus, each opposed pair of rollers 15 are pushed by the bar 22 of the control retainer member 16A and the bar 26 of the rotary retainer member 16B, respectively, toward each other, until the rollers 15 move to the neutral position where the rollers 15 are disengaged from the cylindrical surface 12 and the cam surfaces 14. The two-way clutch 10 thus disengages.

With the two-way clutch 10 disengaged, when torque is applied to the input shaft 1 such that the inner ring 13 rotates in one direction, the braking pieces 46 formed on the spring holder 45 push either the bars 22 of the control retainer member 16A or the bars 26 of the rotary retainer member 16B, thus rotating the control retainer member 16A and the rotary retainer member 16B together with the inner ring 13. At this time, since the opposed pairs of rollers 15 are in the disengaged neutral position, the rotation of the inner ring 13 is not transmitted to the outer ring 11, so that the inner ring 13 rotates freely.

When the control retainer member 16A and the rotary retainer member 16B rotate relative to each other in the direction in which the circumferential widths of the pockets 27 decrease, the bars 22 of the control retainer member 16A and the bars 26 of the rotary retainer member 16B abut the respective side edges of the braking pieces 46 of the spring holder 45, preventing any further relative rotation between the retainer members 16A and 16B.

This in turn prevents the elastic members 20 from being compressed more than necessary, and thus prevents breakage of the elastic members 20 due to fatigue, even though the elastic members 20 are repeatedly compressed and expanded.

With the inner ring 13 rotating alone, if the electromagnetic coil 53a is de-energized, the attraction force applied to the armature 51 disappears, so that the armature 51 becomes rotatable. This in turn allows the control retainer member 16A and the rotary retainer member 16B to be rotated relative to each other in the direction in which the circumferential widths of the pockets 27 increase, under the biasing force of the elastic members 20, until the rollers 15 are moved to the stand-by position, where the rollers 15 can instantly engage the cylindrical surface 12 and the cam surfaces 14 (see FIG. 2). In this state, torque is transmitted between the inner ring 13 and the outer ring 11 through one of each opposed pair of rollers 15.

If in this state the input shaft 1 is stopped and then rotated in the opposite direction, the rotation of the inner ring 13 is transmitted to the outer ring 11 through the other of each opposed pair of rollers 15.

When the electromagnetic coil 53a is de-energized, since the control retainer member 16A and the rotary retainer member 16B are rotated relative to each other in the direction in which the circumferential widths of the pockets 27 increase such that the rollers 15 are moved to the stand-by position, where the opposed pairs of rollers 15 can instantly wedge into the cylindrical surface 12 and the respective cam surfaces 14, the rollers 15 scarcely move in the rotational direction when the clutch engages. Also, since the inner ring 13 is integral with the input shaft 1, the rotation of the input shaft 1 can be instantly transmitted to the outer ring 11 through the inner ring 13.

Since the rotation of the inner ring 13 is transmitted to the outer ring 11 through rollers 15 which are equal in number to the cam surfaces 14, it is possible to transmit large torque from the inner ring 13 to the outer ring 11.

When the control retainer member 16A and the rotary retainer member 16B rotate relative to each other in the direction in which the circumferential widths of the pockets 27 increase, the balls 43 roll toward the shallow portions of the respective opposed pairs of cam grooves 41 and 42 until the balls 43 reach the position shown in FIG. 6(b).

When the control retainer member 16A is pressed against the armature 51 by the electromagnetic clutch 50, and as a result, the opposed pairs of rollers 15 are pushed by the bars 22 of the control retainer member 16A and the bars 26 of the rotary retainer member 16B to their disengaged position, the bars 22 of the control retainer member 16A and the bars 26 of the rotary retainer member 16B collide hard against the respective circumferential sides of the braking pieces 46 of the spring holder 45. If, due to such hard collision, the spring holder 45 should be moved in the axial direction and inclined, the spring holder 45 might prevent the control retainer member 16A from returning to the predetermined disengaged position when the electromagnetic clutch 50 is disengaged, keeping the two-way clutch 10 in engagement in error.

But in the embodiment, since the spring holder 45 is axially positioned by the positioning means comprising welding, even if the spring holder 45 moves in the circumferential direction, the spring holder 45 never moves in the axial direction. Thus, the spring holder 45 will never prevent axial movement of the control retainer member 16A, which in turn prevents untimely engagement of the two-way clutch 10.

In the embodiment of FIG. 1, since the control retainer member 16A and the rotary retainer member 16B are mounted such that the bars 22 and 26 thereof are disposed between the outer ring 11 and the inner ring 13, while the flanges 21 and 28 thereof, which axially face each other, are disposed between the outer ring 11 and the armature 51, it is possible to use a short and lightweight outer ring 11.

In FIG. 4, as the positioning means, the spring holder 45 is welded to the input shaft 1 to axially position the spring holder 45. But the positioning means is not limited to such an arrangement. FIGS. 7 to 11 show different positioning means. The positioning means of FIG. 7 comprises a snap ring fitting groove 60 formed in the holder fitting surface 44, and a snap ring 61 fitted in the snap ring fitting groove 60, thus axially positioning the spring holder 45.

Figure 8:
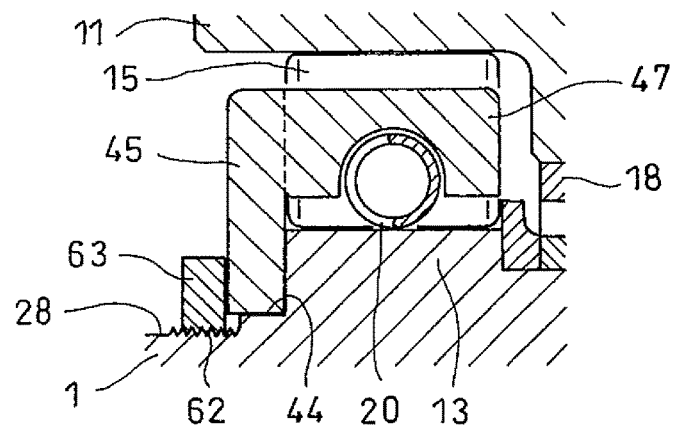
FIG. 8 is a sectional view of a further different positioning means for the spring holder.

The positioning means of FIG. 8 comprises an external thread 62 formed on the end of the slide guide surface 28 formed on the input shaft 1, and a nut member 63 held in threaded engagement with the external thread 62. By tightening the nut member 63, the radially inner portion of the spring holder 45 is sandwiched from both sides by the nut member 63 and the inner ring 13.

Figure 9:
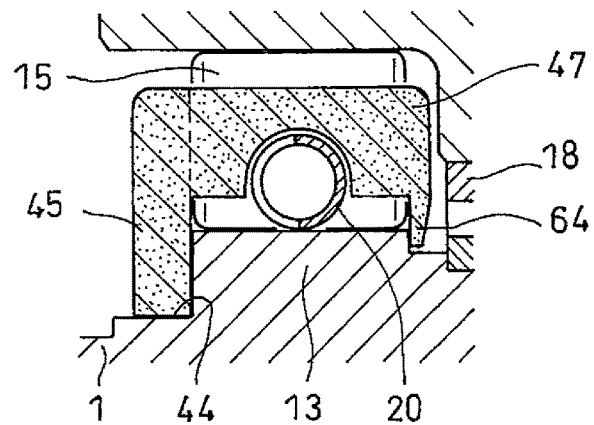
FIG. 9 is a sectional view of a further different positioning means for the spring holder.

The positioning means of FIG. 9 comprises inwardly extending engaging claws 64 formed at ends of the respective spring retaining pieces 47 of the spring holder 45. The engaging claws 64 are in engagement with a second axial side surface of the inner ring 13, thereby preventing axial movement of the spring holder 45. In this arrangement, it is possible to form the spring holder 45 from resin, thereby reducing the cost.

Figure 10:
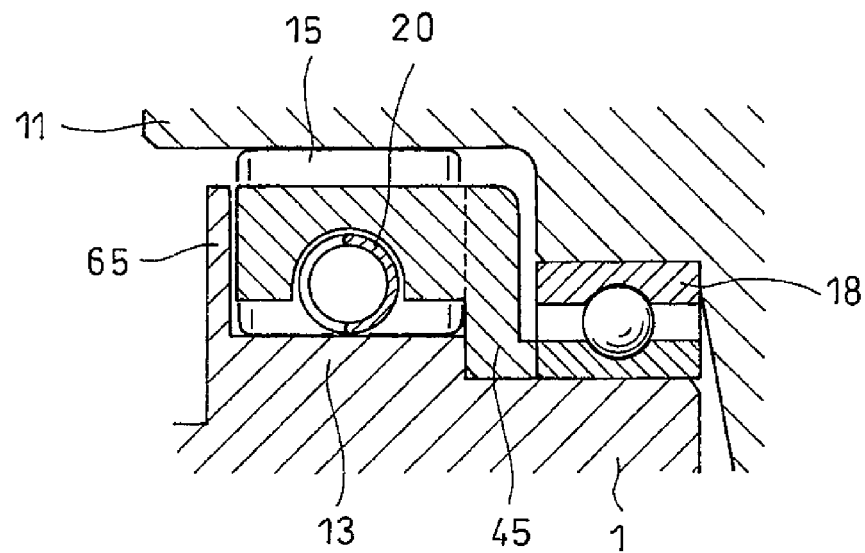
FIG. 10 is a sectional view of a further different positioning means for the spring holder.

In the arrangement of FIG. 10, the spring holder 45 is fitted between the second axial side surface of the inner ring 13 and the opposed portion of the bearing 18, which rotatably supports the input shaft 1, such that the radially inner portion of the spring holder 45 is sandwiched between the inner ring 13 and the bearing 18. In this arrangement, the inner ring 13 is preferably formed with an outwardly extending washer portion 65 at the first axial end thereof to prevent separation of the rollers 15.

Figure 11:
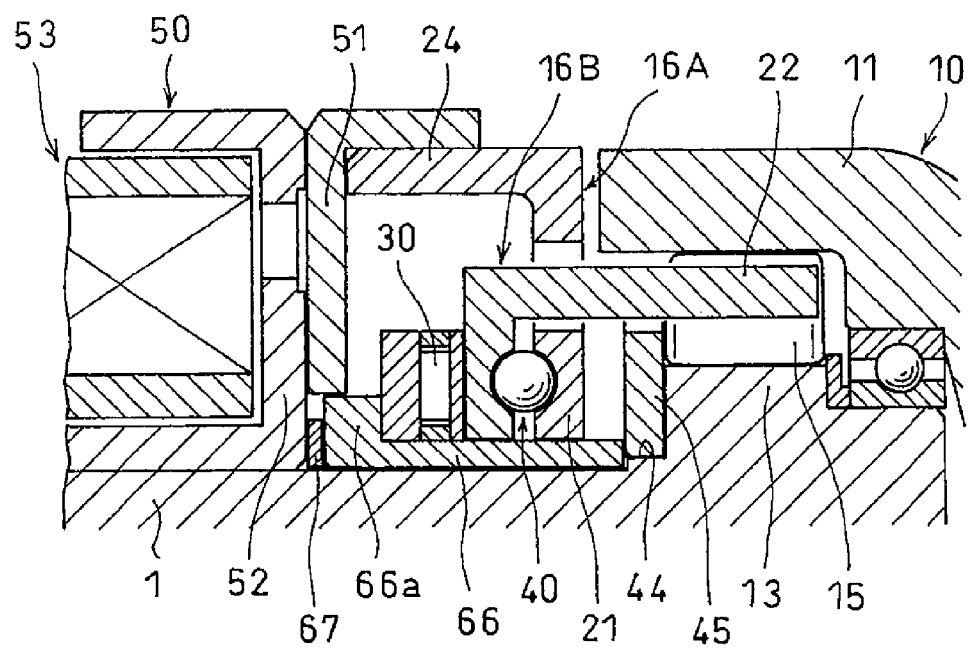
FIG. 11 is a sectional view of a further different positioning means for the spring holder.

The positioning means of FIG. 11 comprises a spacer 66 having at the first end thereof a guide ring portion 66a slidably supporting the armature 51, and a shim 67. The spacer 66 and the shim 67 are mounted between the rotor 52 and the spring holder 45, thus axially positioning the spring holder 45.

Figure 12:
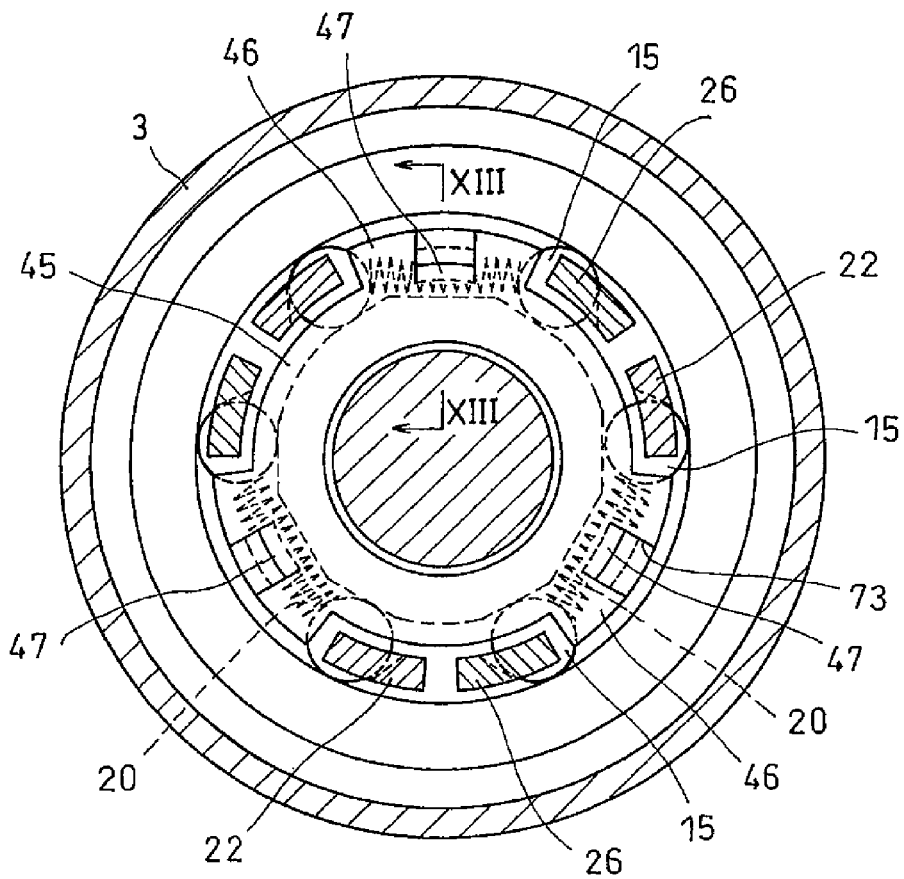
FIG. 12 is sectional view of a different spring holder.
Figure 13:
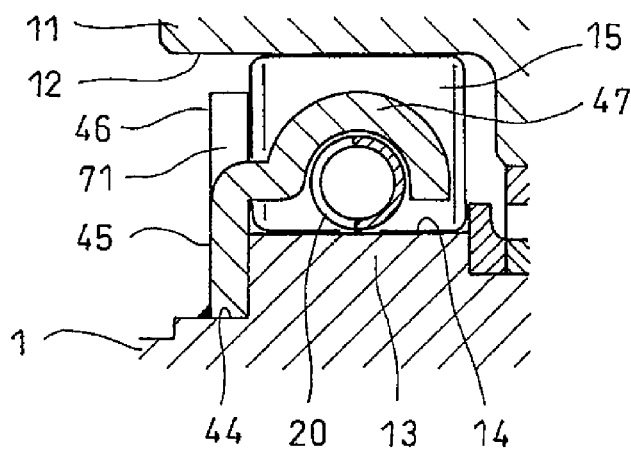
FIG. 13 is sectional view taken along line XIII-XIII of FIG. 12.
Figure 14:
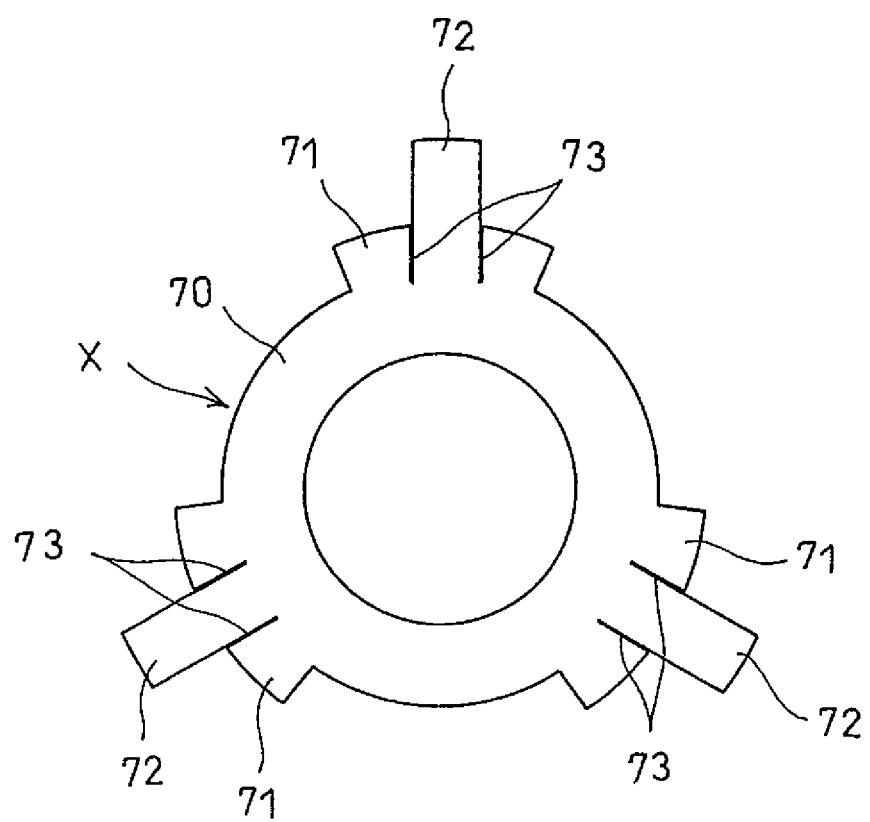
FIG. 14 is a front view of a holder blank to be formed into the spring holder, which is formed by pressing.

FIGS. 12 and 13 show a different spring holder 45. This spring holder 45 is formed by pressing a steel plate. In particular, as shown in FIG. 14, by pressing a steel plate, a holder blank X is formed which includes a plurality of braking piece portions 71 formed, by press-cutting, on the outer periphery of an annular plate portion 70, and each having a spring retaining piece portion 72 on the outer periphery of the braking piece portion 71 at its circumferential center. Two parallel cuts 73 are formed in each braking piece portion 71 along the side edges of the spring retaining piece portion 72. The spring retaining piece portions 72 are each bent in the axial direction along the straight line extending between the ends of the two cuts 73, and then bent into a circular arc shape so as to extend along the outer periphery of the elastic member 20.

The spring holder 45 formed by pressing a steel plate in the above manner is less expensive and lighter in weight.

The two-way clutch 10 of the embodiment of FIGS. 1 and 2 is a roller type clutch configured such that when the electromagnet 53 is energized, the control retainer member 16A is moved axially, and the control retainer member 16A and the rotary retainer member 16B are rotated relative to each other in such a direction that the rollers 15 as the engaging elements engage the inner periphery of the outer ring 11 and the outer periphery of the inner ring 13. But the two-way clutch 10 may be of a different type.

Figure 15:
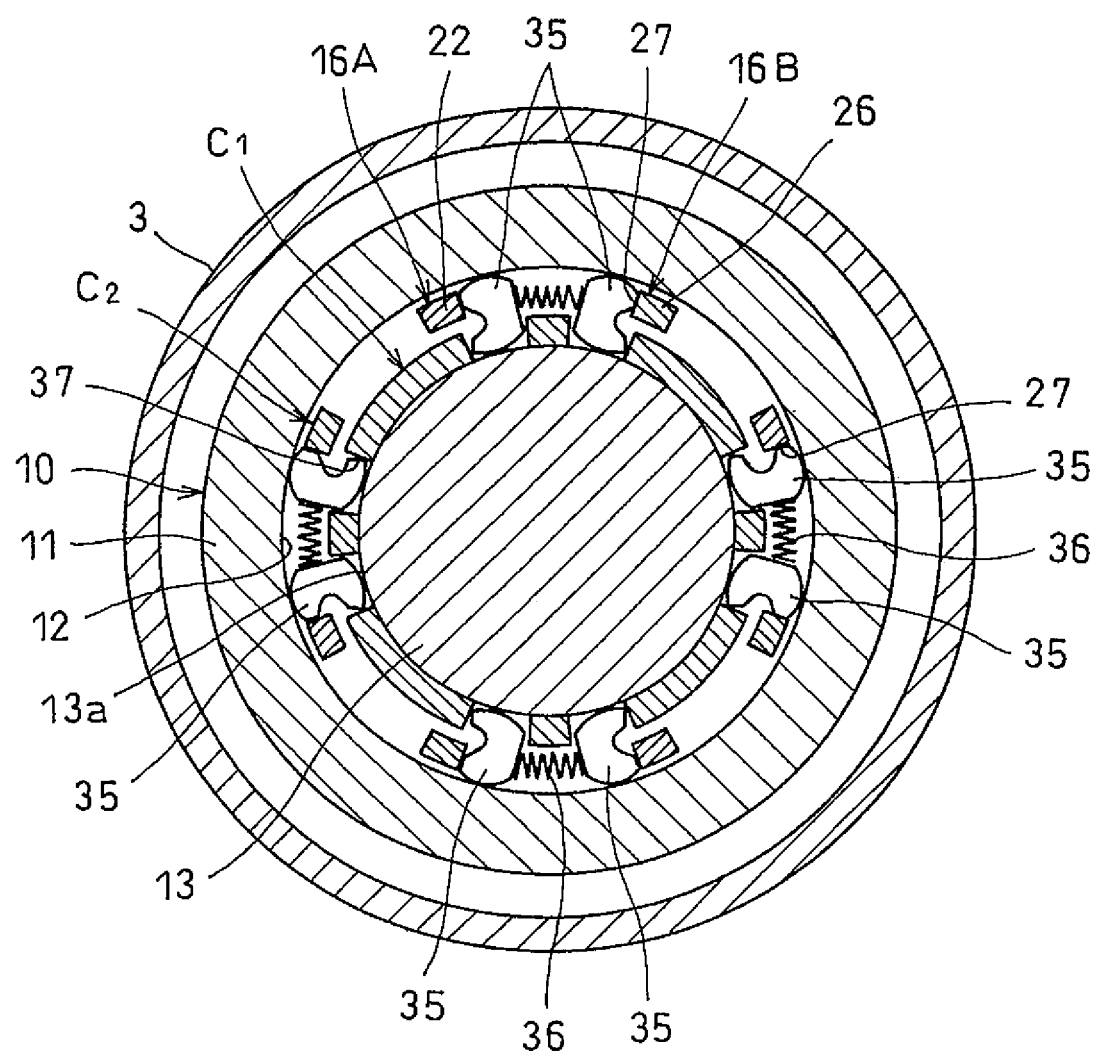
FIG. 15 is a sectional view of a different two-way clutch.

For example, the two-way clutch may be a sprag type clutch shown in FIG. 15, which includes a small-diameter retainer $C_1$, and a large-diameter retainer $C_2$ provided around the small-diameter retainer $C_1$ and comprising a control retainer member 16A and a rotary retainer member 16B which are exactly identical to the retainer members 16A and 16B used in the embodiment of FIGS. 1 to 3. A pair of sprags 35, as engaging elements, and an elastic member 36 are mounted in each of the pockets 27 defined between adjacent pairs of the bars 22 of the control retainer member 16A and the bars 26 of the rotary retainer member 16B, with the elastic member 36 disposed between the pair of sprags 35. The sprags 35 have their inner ends inserted in respective ones of pockets 27 formed in the small-diameter retainer $C_1$ so as to be pivotable about the inner ends.

In the embodiment in which the sprag type two-way clutch 10 is used, when the electromagnet 53 of the electromagnetic clutch 50 is de-energized, each pair of sprags 35 are pivoted such that their outer ends move away from each other under the biasing force of the elastic member 36, thus engaging the inner cylindrical surface 12 of the outer ring 11 and the outer cylindrical surface 13a of the inner ring 13. When the electromagnet 53 is energized, the control retainer member 16A is moved axially and simultaneously, the control retainer member 16A and the rotary retainer member 16B are rotated relative to each other in such a direction that the bars 22 and 26 of the respective retainer members push the sprags 35 such that the outer ends of each pair of sprags 35 move toward each other, until the sprags 35 disengage from the inner cylindrical surface 12 of the outer ring 11 and the outer cylindrical surface 13a of the inner ring 13.

DESCRIPTION OF THE NUMERALS

1. Input shaft
2. Output shaft
10. Two-way clutch
11. Outer ring
13. Inner ring
15. Roller (engaging element)
16A. Control retainer member
16B. Rotary retainer member
22. Bar
26. Bar
27. Pocket
35. Sprag (engaging element)
36. Elastic member
45. Spring holder
46. Braking piece
47. Spring retaining piece
61. Snap ring
62. External thread
63. Nut member
64. Engaging claw
66. Spacer

What is claimed is:

1. A rotation transmission device comprising an input shaft, an output shaft arranged coaxially with the input shaft, a two-way clutch configured to selectively transmit torque between the input shaft and the output shaft, and an electromagnetic clutch configured to selectively engage and disengage the two-way clutch, wherein the two-way clutch comprises:
an outer ring provided at an end of the output shaft;
an inner ring provided at an end of the input shaft;
a control retainer and a rotary retainer having bars disposed between an inner periphery of the outer ring and an outer periphery of the inner ring and arranged such that the bars of the control retainer circumferentially alternate with the respective bars of the rotary retainer, with pockets defined between adjacent ones of the bars of the control retainer and the rotary retainer;
a plurality of pairs of engaging elements, each pair of the engaging elements being mounted in one of the pockets so as to be engageable with the inner periphery of the outer ring and the outer periphery of the inner ring; and
elastic members mounted in the respective pockets and biasing the respective pairs of engaging elements away from each other, wherein the electromagnetic clutch includes an electromagnet, and is configured such that when the electromagnet is energized, the electromagnetic clutch moves the control retainer in an axial direction, thereby rotating the control retainer and the rotary retainer relative to each other in a direction in which circumferential widths of the pockets decrease, and disengaging the engaging elements, wherein each of the control retainer and the rotary retainer includes an annular flange having a side surface from which the respective bars extend, wherein the annular flange of the control retainer and the annular flange of the rotary retainer are axially opposed to each other, are disposed axially outside of the outer ring, and are disposed between the outer ring and the electromagnetic clutch in the axial direction, wherein the annular flange of the rotary retainer is located axially closer to the electromagnet than is the annular flange of the control retainer, wherein a torque cam is provided between the annular flange of the control retainer and the annular flange of the rotary retainer, and is configured to rotate the control retainer and the rotary retainer relative to each other in a direction in which the circumferential widths of the pockets decrease, and disengage the engaging elements, when the control retainer is moved in the axial direction by the electromagnetic clutch, wherein the rotation transmission device further comprises:
an annular spring holder kept in abutment with a first axial end surface of the inner ring that is located axially closer to the torque cam than is a second axial end surface of the inner ring, and rotationally fixed to the inner ring;
braking pieces provided at an outer periphery of the spring holder and configured to support the bars of the control retainer and the rotary retainer so as to prevent the control retainer and the rotary retainer from rotating relative to each other in the direction in which the circumferential widths of the pockets decrease, from a neutral position where the pairs of engaging elements are disengaged; and
spring retaining pieces extending from outer peripheral portions of the respective braking pieces so as to be located radially outwardly of the respective elastic members, thereby preventing separation of the elastic members, wherein the inner ring is integral with the input shaft such that the inner ring and the input shaft together form a one-piece member and such that the inner ring and the input shaft are inseparable from each other, and wherein the rotation transmission device further comprises a positioning arrangement configured to prevent separation of the spring holder from the first axial end surface of the inner ring toward the torque cam.

2. The rotation transmission device of claim 1, wherein the positioning arrangement comprises an arrangement that fixes the spring holder to the input shaft.

3. The rotation transmission device of claim 1, wherein the positioning arrangement comprises a snap ring mounted to a radially outer surface of the input shaft.

4. The rotation transmission device of claim 1, wherein the positioning arrangement comprises an external thread formed on a radially outer surface of the input shaft, and a nut member kept in threaded engagement with the external thread, and wherein the spring holder has an inner peripheral portion sandwiched by the nut member and the inner ring from opposite axial sides.

5. The rotation transmission device of claim 1, wherein the positioning arrangement comprises engaging claws extending inwardly from ends of the respective spring retaining pieces of the spring holder and engaging an axial side surface of the inner ring.

6. The rotation transmission device of claim 1, wherein the positioning arrangement comprises a bearing mounted in the outer ring and rotatably supporting the end of the input shaft, wherein the spring holder is mounted between the bearing and the inner ring, and has an inner peripheral portion sandwiched between the inner ring and the bearing.

7. The rotation transmission device of claim 1, wherein the positioning arrangement comprises a spacer disposed between opposed portions of the electromagnetic clutch and the spring holder and pressing the spring holder against the axial end surface of the inner ring.

8. The rotation transmission device of claim 1, wherein the spring holder is a member formed by pressing a steel plate.

9. The rotation transmission device of claim 2, wherein the spring holder is a member formed by pressing a steel plate.

10. The rotation transmission device of claim 3, wherein the spring holder is a member formed by pressing a steel plate.

11. The rotation transmission device of claim 4, wherein the spring holder is a member formed by pressing a steel plate.

12. The rotation transmission device of claim 5, wherein the spring holder is a member formed by pressing a steel plate.

13. The rotation transmission device of claim 6, wherein the spring holder is a member formed by pressing a steel plate.

14. The rotation transmission device of claim 7, wherein the spring holder is a member formed by pressing a steel plate.

\* \* \* \* \*